(12) United States Patent
Murai

(10) Patent No.: US 6,419,213 B2
(45) Date of Patent: Jul. 16, 2002

(54) LIQUID-FILLED VIBRATION ISOLATOR

(75) Inventor: Hirotaka Murai, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/817,349

(22) Filed: Mar. 27, 2001

(30) Foreign Application Priority Data

Mar. 27, 2000 (JP) ........................................ 2000-087227

(51) Int. Cl.$^7$ ................................................. F16F 5/00
(52) U.S. Cl. ............................ 267/140.12; 267/140.5; 267/141.2; 267/141; 267/219
(58) Field of Search .......................... 267/141, 140.12, 267/140.3, 140.5, 141.2, 152, 219, 293, 140.11; 248/562, 636

(56) References Cited

U.S. PATENT DOCUMENTS

| | | | | |
|---|---|---|---|---|
| 4,896,868 A | * | 1/1990 | Thelamon et al. | 267/140.1 |
| 5,026,031 A | * | 6/1991 | Court | 267/140.12 |
| 5,356,121 A | * | 10/1994 | Ikeda | 267/140.5 |
| 5,547,172 A | * | 8/1996 | Corcoran | 267/140.13 |
| 5,595,373 A | * | 1/1997 | Ikeda | 267/140.12 |

FOREIGN PATENT DOCUMENTS

| JP | 06042577 A | * | 2/1994 | 267/140.12 |
|---|---|---|---|---|

* cited by examiner

Primary Examiner—Paul N. Dickson
Assistant Examiner—Mariano Sy
(74) Attorney, Agent, or Firm—Oblon, Spivak, McClelland, Maier & Neustadt, P.C.

(57) ABSTRACT

A liquid-filled vibration isolator includes an inner cylindrical metal member; a cylindrical intermediate metal member disposed outside the inner cylindrical metal member in a substantially coaxial manner and including a pair of ring portions disposed at corresponding axial ends thereof, a pair of connection portions integrally connecting the ring portions, and a pair of window portions defined by the ring portions and the connection portions; a rubber elastic-body connecting the intermediate metal member and the inner cylindrical metal member and having cavity portions corresponding to the window portions; and an outer cylindrical metal member fixedly disposed outside the intermediate metal member and sealed in a liquid-tight manner against the intermediate metal member by means of a rubber seal portion. The rubber elastic-body includes first and second diaphragm portions formed on the front side of the inner cylindrical metal member with respect to the front-rear direction of the vehicle, and third and fourth diaphragm portions formed on the rear side of the inner cylindrical metal member with respect to the front-rear direction of the vehicle. Among the first through fourth diaphragm portions, the first and fourth diaphragm portions located diagonally opposite each other with respect to the inner cylindrical metal member are longer than the second and third diaphragm portions.

5 Claims, 7 Drawing Sheets

PRIOR ART

LIQUID-FILLED VIBRATION ISOLATOR

BACKGROUND OF THE INVENTION

1. Field of the Invention

The present invention relates to a liquid-filled vibration isolator, and more particularly to a liquid-filled vibration isolator mounted on a vehicle between a body and, for example, a sub-frame and adapted to reduce oblique vibration input.

2. Description of the Related Art

Conventionally, such a liquid-filled vibration isolator includes, as shown in FIGS. 11 to 13, an inner cylindrical metal member 1, a cylindrical intermediate metal member 2, and a cylindrical rubber elastic-body 3. The intermediate metal member 2 is disposed coaxially outside the inner cylindrical metal member 1 with a space formed therebetween, and includes a pair of ring portions 2a and a pair of connection portions 2b. The ring portions 2a are disposed at corresponding axial ends of the intermediate metal member 2. The connection portions 2b are disposed at radially opposite positions and connect the ring portions 2a to thereby define a pair of window portions 2c in cooperation with the ring portions 2a. The cylindrical rubber elastic-body 3 includes a pair of side wall portions 3a, arm portions 3b, an thin-walled seal portion 3c, and a pair of cavity portions. The side wall portions 3a radially connect the respective ring portions 2a and the inner cylindrical metal member 1. The arm portions 3b extend axially between the side wall portions 3a and inside the connection portions 2b so as to connect the connection portions 2b and the inner cylindrical metal member 1. The thin-walled seal portion 3c is disposed outside the ring portions 2a. The cavity portions are defined by the side wall portions 3a and the arm portions 3b and open at the corresponding window portions 2c.

An outer cylindrical metal member 5 is disposed coaxially outside the intermediate metal member 2 and is fixedly attached to the intermediate metal member 2 via the seal portion 3c through drawing to thereby establish liquid tightness against the intermediate metal member 2. The thus-sealed cavity portions form a pair of liquid chambers 6. An orifice path 7 is formed between and extends along the outer cylindrical metal member 5 and the connection portion 2b so as to establish communication between the two liquid chambers 6.

The thus-configured liquid-filled vibration isolator is mounted on the body of a vehicle in, for example, the following manner. While the two liquid chambers 6 are oriented along the front-rear direction of the vehicle, the inner cylindrical metal member 1 is perpendicularly connected to a support member (not shown) of the vehicle body, and the outer cylindrical metal member 5 is connected to a rear sub-frame (not shown). The liquid-filled vibration isolator receives vibration input P that is imposed obliquely by the sub-frame according to acceleration/deceleration of the vehicle, and functions to damp vibration input P.

However, in the conventional liquid-filled vibration isolator, the side wall portions 3a of the rubber elastic-body 3 extend radially so as to connect the ring portions 2a and the inner cylindrical metal member 1; thus, the free length of the side wall portions 3a is short. As a result, the tensile strain of the side wall portions 3a derived from vibration input P becomes large (for example, the FEM (Finite Element Modeling) strain is about 130% to 215%), thereby impairing durability of the side wall portions 3a.

In order to cope with the above problem, a liquid-filled vibration isolator as shown in FIG. 14 is provided. As shown in FIG. 14, in radial connection of the ring portions 2a and the inner cylindrical metal member 1 by means of side wall portions 3h of the rubber elastic-body 3, the position of connection between the inner cylindrical metal member 1 and each side wall portion 3h is axially shifted toward the axial center of the inner cylindrical metal member 1 such that the side wall portions 3h assume an S-shaped cross section to thereby lengthen the free length thereof. The free length of the side wall portions 3h is thus lengthened in an attempt to ease tensile strain derived from vibration input P in order to enhance the durability of the side wall portions 3h. However, even when the free length of the side wall portions 3h is increased, the tensile strain produced in the side wall portions 3h due to vibration input from an oblique direction is still large, so that the FEM strain thereof becomes 110% or higher, failing to achieve a target FEM strain of 80%. Thus, the liquid-filled vibration isolator still fails to exhibit sufficient durability of the rubber elastic-body 3.

SUMMARY OF THE INVENTION

An object of the present invention is to solve the above-mentioned problem in the conventional liquid-filled vibration isolator and to provide a liquid-filled vibration isolator capable of reducing the tensile strain of side wall portions of a rubber elastic-body produced due to vibrations which are input from an oblique direction according to acceleration/deceleration of a vehicle, to thereby enhance the durability of the rubber elastic-body.

To achieve the above object, the present invention provides a liquid-filled vibration isolator comprising an inner cylindrical metal member; a cylindrical intermediate metal member disposed outside the inner cylindrical metal member with a space formed between the inner cylindrical metal member and the intermediate metal member, the intermediate metal member comprising a pair of ring portions disposed at corresponding axial ends thereof, a pair of connection portions disposed at radially opposite positions and integrally connecting the ring portions, and a pair of window portions defined by the ring portions and the connection portions; a rubber elastic-body comprising a pair of inclined side wall portions connecting the ring portions of the intermediate metal member and an axially central portion of the inner cylindrical metal member along a circumferential direction, arm portions axially connecting the side wall portions and connecting the connection portions and the inner cylindrical metal member, and a pair of cavity portions defined by the side wall portions and the arm portions and opening at the corresponding window portions; an outer cylindrical metal member fixedly disposed outside the intermediate metal member in a substantially coaxial manner and sealed in a liquid-tight manner against the intermediate metal member by means of a rubber seal portion, to thereby define a pair of liquid chambers in the corresponding cavity portions; and an orifice path formed between and extending along the outer cylindrical metal member and the connection portion of the intermediate metal member so as to establish communication between the liquid chambers. The inner cylindrical metal member is oriented in a vertical direction and fixedly attached to a member of a vehicle body with the liquid chambers being oriented in the front-rear direction of a vehicle, and the outer cylindrical metal member is fixedly attached to a counterpart member. A first pair of inclined side wall portions are formed at one of radially opposite circumferential positions between the connection portions so as to be located on the front side of the inner cylindrical metal member with respect to the front-rear direction of the vehicle, and a second pair of inclined side wall portions are formed at the other of the radially opposite circumferential positions so as to be located on the rear side of the inner cylindrical metal member with respect to the front-rear direction of the vehicle. Among the first and second pairs of inclined side wall portions, two inclined side wall portions located diagonally opposite each other with respect to the inner cylindrical metal member are longer than the remaining two side wall portions.

Preferably, the diagonal direction along which the longer side wall portions extend coincides with the direction of vibration input.

In the present invention, the inner cylindrical metal member is oriented in a vertical direction and fixedly attached to a member of a vehicle body in a sate in which the pair of liquid chambers are oriented in the front-rear direction of a vehicle, and among the side wall portions of the rubber elastic-body, the longer side wall portions located diagonally opposite each other with respect to the inner cylindrical metal member are oriented in the front-rear direction and in a vibration input direction. In this state, the outer cylindrical metal member is fixedly attached to a counterpart member, which receives vibrations generated in an oblique direction with respect to the front-rear direction of the vehicle. Since the side wall portions for coping with vibrations which are input from an oblique direction according to acceleration/deceleration of the vehicle have increased free lengths, the tensile strain of the side wall portions of the rubber elastic-body derived from the vibration input can be reduced.

As described above, among the side wall portions of the rubber elastic-body of the liquid-filled vibration isolator, the longer side wall portions located diagonally opposite each other with respect to the inner cylindrical metal member are disposed in order to cope with vibrations which are input from an oblique direction according to acceleration/deceleration of the vehicle, the tensile strain of the side wall portions of the rubber elastic-body derived from the vibration input can be reduced, thereby enhancing the durability of the rubber elastic-body.

Further preferably, the liquid-filled vibration isolator further comprises a pair of stoppers fixedly attached to the outer cylindrical surface of the inner cylindrical metal member in such a manner as to project into the corresponding liquid chambers and in such a manner as to be vertically biased toward opposite directions with respect to the center of the inner cylindrical metal member.

Still further preferably, the side wall portions each assume an S-shaped axial cross section to thereby lengthen the side wall portions.

DESCRIPTION OF THE PREFERRED EMBODIMENT

Figure 1:
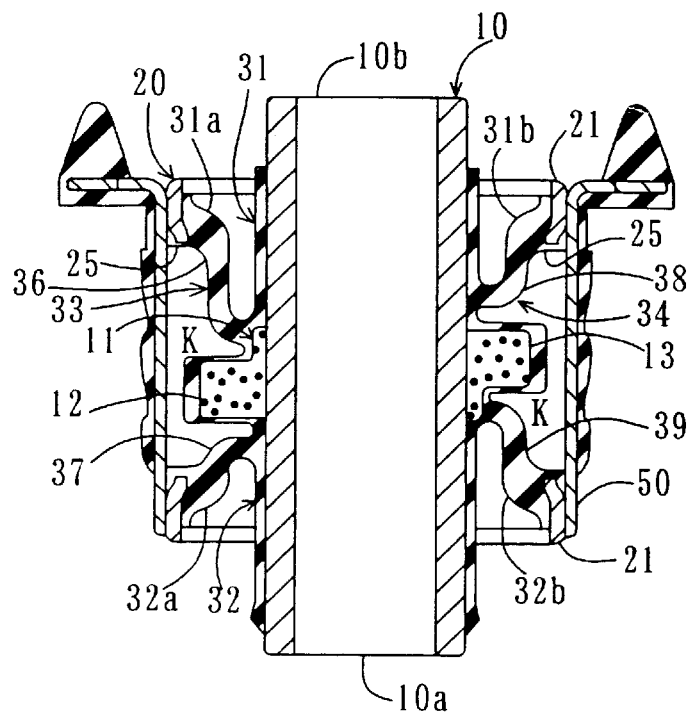
FIG. 1 is a schematic sectional view of a liquid-filled vibration isolator according to an embodiment of the present invention taken along line I—I of FIG. 3.
Figure 2:
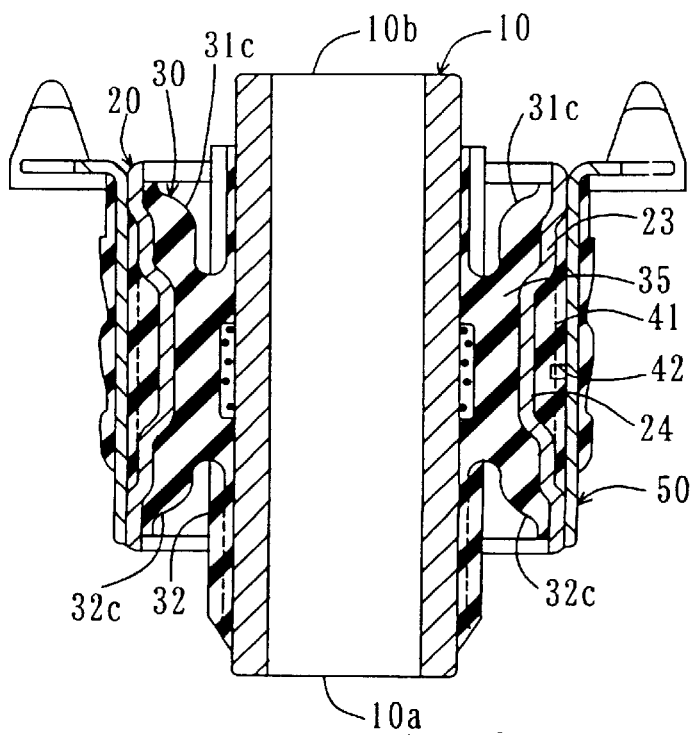
FIG. 2 is a schematic sectional view of the liquid-filled vibration isolator taken along line II—II of FIG. 3.
Figure 3:
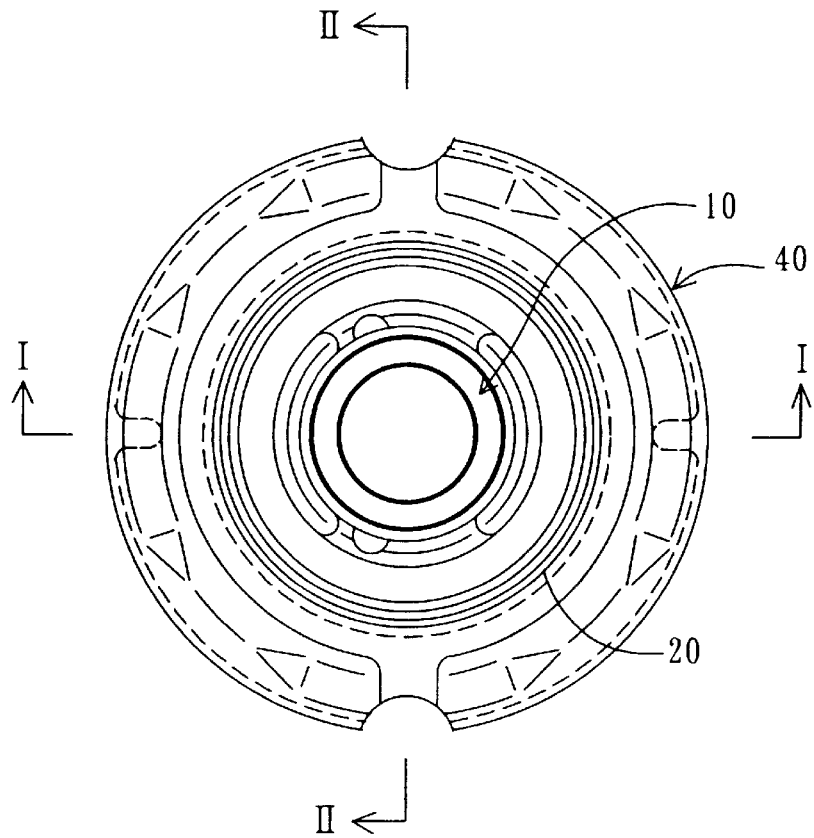
FIG. 3 is a schematic plan view showing the liquid-filled vibration isolator.
Figure 4:
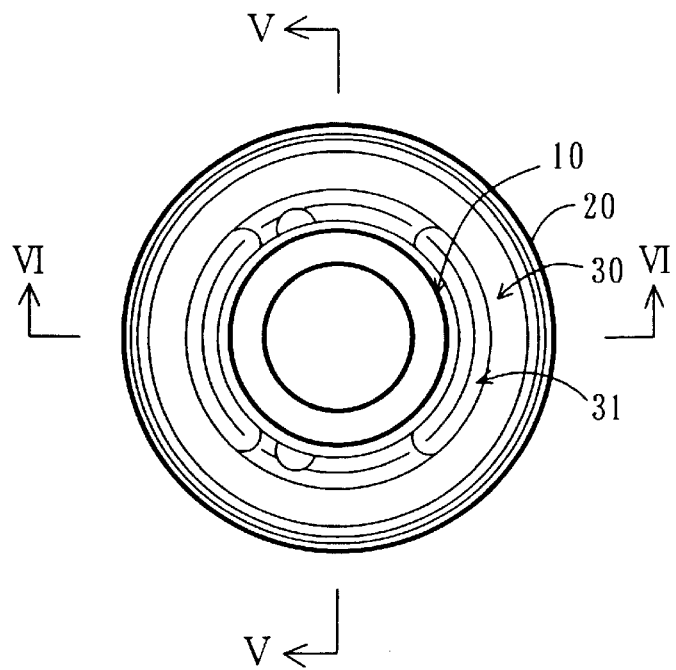
FIG. 4 is a plan view showing a vulcanized rubber molding M, which is an intermediate product of the liquid-filled vibration isolator.
Figure 5:
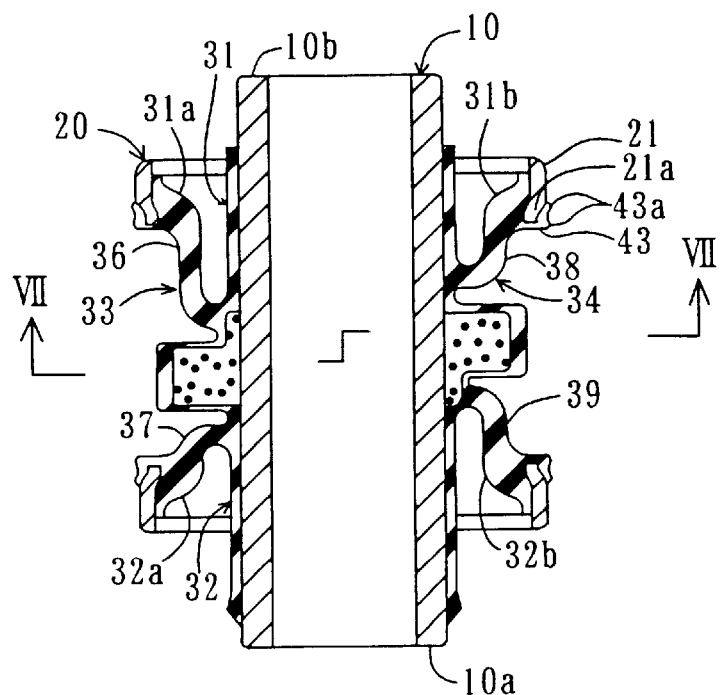
FIG. 5 is a sectional view of the vulcanized rubber molding M taken along line V—V of FIG. 4.
Figure 6:
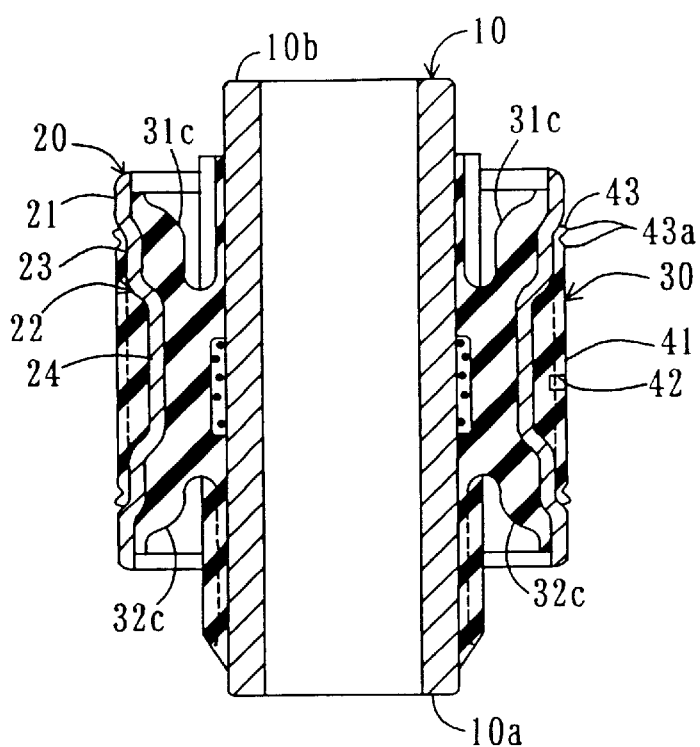
FIG. 6 is a sectional view of the vulcanized rubber molding M taken along line VI—VI of FIG. 4.
Figure 7:
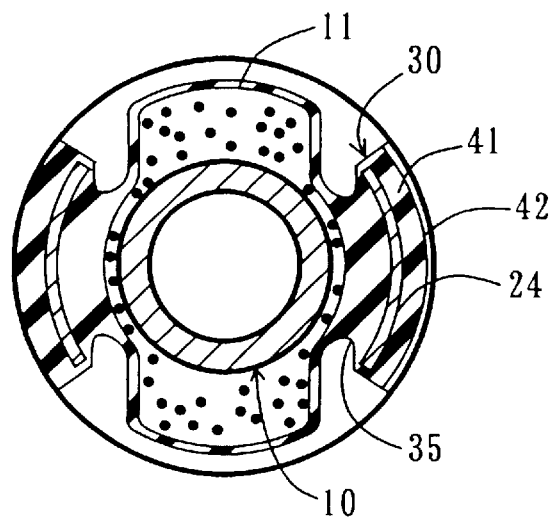
FIG. 7 is a sectional view of the vulcanized rubber molding M taken along line VII—VII of FIG. 5.

An embodiment of the present invention will next be described in detail with reference to the drawings. FIGS. 1 and 2 show a liquid-filled vibration isolator according to the embodiment by means of sectional views taken along lines I—I and II—II, respectively, of FIG. 3. FIG. 3 shows the liquid-filled vibration isolator by means of a plan view. FIG. 4 shows an intermediate vulcanized product not to be fitted into an outer cylindrical metal member. FIGS. 5 and 6 show the intermediate vulcanized product by means of sectional views taken along lines V—V and VI—VI, respectively, of FIG. 4. FIG. 7 shows the intermediate vulcanized product by means of a sectional view taken along line VII—VII of FIG. 5.

The liquid-filled vibration isolator includes an inner cylindrical metal member 10 assuming the form of a pipe; a substantially cylindrical intermediate metal member 20, which is disposed outside the inner cylindrical metal member 10 in a substantially coaxial manner and which in turn includes a pair of ring portions 21 disposed at corresponding axial ends thereof, and a pair of connection portions 22 connecting the ring portions 21; a substantially cylindrical rubber elastic-body 30 which elastically connects the intermediate metal member 20 and the inner cylindrical metal member 10; and an outer cylindrical metal member 50 fixedly attached onto the intermediate metal member 20 in a liquid-tight manner.

An annular stopper member 11 made of resin is fixedly fitted onto the inner cylindrical metal member 10. The stopper member 11 includes a first protrusion portion 12 and a second protrusion portion 13, which project in radially opposite directions with respect to the inner cylindrical metal member 10 and are slightly shifted from the axially central position of the inner cylindrical metal member 10 toward one end 10a and toward the other end 10b, respectively, of the inner cylindrical metal member 10. The stopper member 11 is usually formed on the inner cylindrical metal member 10 through integral resin molding. However, a separately formed stopper member 11 may be bonded onto the inner cylindrical metal member 10. Also, the stopper member 11 may be formed of metal instead of resin.

The intermediate metal member 20 is shorter in axial length than the inner cylindrical metal member 10 and is disposed substantially coaxially with the inner cylindrical metal member 10 and between the opposite ends of the inner cylindrical metal member 10 such that the distance between the one end 10a of the inner cylindrical metal member 10 and the corresponding end (the lower end illustrated in the drawings) of the intermediate metal member 20 is longer than that between the other end 10b and the corresponding end (the upper end illustrated in the drawings) of the intermediate metal member 20. An axially inward end portion of each of the paired ring portions 21 of the intermediate metal member 20 is reduced in diameter to form a reduced-diameter portion 21a. As shown in FIG. 7, the paired connection portions 22 are located at radially opposite positions and fan out along the circumferential direction at a predetermined central angle. Also, the paired connection portions 22 extend axially and are integrally connected with the paired ring portions 21. As shown in FIG. 2, each of the connection portions 22 is formed in the following manner. The reduced-diameter portions 21a of the ring portions 21 extend axially inward to form axially opposite end portions of the connection portion 22; i.e., first reduced-diameter portions 23. An axially central portion of the connection portion 22 which is located between the first reduced-diameter portions 23 is reduced further in diameter to form a second reduced-diameter portion 24. The ring portions 21 and the connection portions 22 define a pair of window portions 25.

The rubber elastic-body 30 connects the intermediate metal member 20 and the inner cylindrical metal member 10 along the entire circumference. Axially opposite end portions of the rubber elastic-body 30 are formed into annular first and second end-cavity portions 31 and 32, which extend along the inner cylindrical metal member 10 from the ring portions 21 to the vicinities of the stopper member 11. Each of the first and second end-cavity portions 31 and 32 have a relatively large width in the vicinity of the corresponding axial end portion, and on the axially inner side thereof, the radially outer-side wall surface approaches toward the inner cylindrical metal member 10, so that the width decreases accordingly. The first end-cavity portion 31 corresponding to the other end 10b (the upper end illustrated in the drawings) includes a deep first portion 31a, which extends to the vicinity of the first protrusion portion 12 of the stopper member 11; a shallow second portion 31b, which extends to the vicinity of the second protrusion portion 13; and a pair of shallow third portions 31c corresponding to the connection portions 22. The first, second, and third portions 31a, 31b, and 31c communicate with one another in the circumferential direction. The second end-cavity portion 32 corresponding to the one end 10a (the lower end illustrated in the drawings) includes a very shallow first portion 32a, which extends to the vicinity of the first protrusion portion 12 of the stopper member 11; a deep second portion 32b, which extends to the vicinity of the second protrusion portion 13; and a pair of very shallow third portions 32c corresponding to the connection portions 22. The first, second, and third portions 32a, 32b, and 32c communicate with one another in the circumferential direction. Side portions of the rubber elastic-body 30 which correspond to the window portions 25 of the intermediate metal portion 20 as well as the first and second protrusion portions 12 and 13 of the stopper member 11 are recessed to thereby form a first side-cavity portion 33 and a second side-cavity portion 34. Portions of the rubber elastic-body 30 located between the connection portions 22 and the inner cylindrical metal member 10 serve as arm portions 35, which connect the connection portions 22 and the inner cylindrical metal member 10.

The first side-cavity portion 33 and the deep first portion 31a of the first end-cavity portion 31 constitute a first diaphragm portion 36, which serves as a thin-walled, axially long side wall portion. The first diaphragm portion 36 is substantially perpendicularly connected to the ring portion 21 and the inner cylindrical metal member 10 and assumes a substantially S-shaped axial cross section. The first side-cavity portion 33 and the very shallow first portion 32a of the second end-cavity portion 32 constitute a second diaphragm portion 37, which serves as a thin-walled, axially short side wall portion. As in the case of the first diaphragm portion 36, the second diaphragm portion 37 is substantially perpendicularly connected to the ring portion 21 and the inner cylindrical metal member 10 and assumes a substantially S-shaped axial cross section.

The second side-cavity portion 34 and the shallow second portion 31b of the first end-cavity portion 31 constitute a third diaphragm portion 38, which serves as a thin-walled, axially short side wall portion. As in the case of the first diaphragm portion 36, the third diaphragm portion 38 is substantially perpendicularly connected to the ring portion 21 and the inner cylindrical metal member 10 and assumes a substantially S-shaped axial cross section. The second side-cavity portion 34 and the deep second portion 32b of the second end-cavity portion 32 constitute a fourth diaphragm portion 39, which serves as a thin-walled, axially long side wall portion. As in the case of the first diaphragm portion 36, the fourth diaphragm portion 39 is substantially perpendicularly connected to the ring portion 21 and the inner cylindrical metal member 10 and assumes a substantially S-shaped axial cross section.

As shown in FIGS. 5 and 6, a portion of the rubber elastic-body 30 forms an exterior rubber portion 41, which is formed on the outer circumferential surface of each of the connection portions 22 of the intermediate metal member 20 in such a manner as to be slightly projected beyond the outer circumferential surface of each of the ring portions 21. A groove portion 42 is formed on the outer circumferential surface of one exterior rubber portion 41 at an axially intermediate position in such a manner as to extend sideward along the circumferential direction. A rubber elastic-body seal portion 43 is formed on the outer circumferential surface of the reduced-diameter portion 21a of each of the ring portions 21. The rubber elastic-body seal portion 43 includes two annular seal lips 43a, which slightly project radially outward along the entire circumference thereof.

The rubber elastic-body 30 is formed integral with the inner cylindrical metal member 10 and the intermediate metal member 20 through vulcanizing molding by use of an unillustrated mold in which the inner cylindrical metal member 10 and the intermediate metal member 20 are preset, thereby forming a vulcanized rubber molding M, which is an intermediate product including the inner cylindrical metal member 10 and the intermediate metal member 20.

Figure 8:
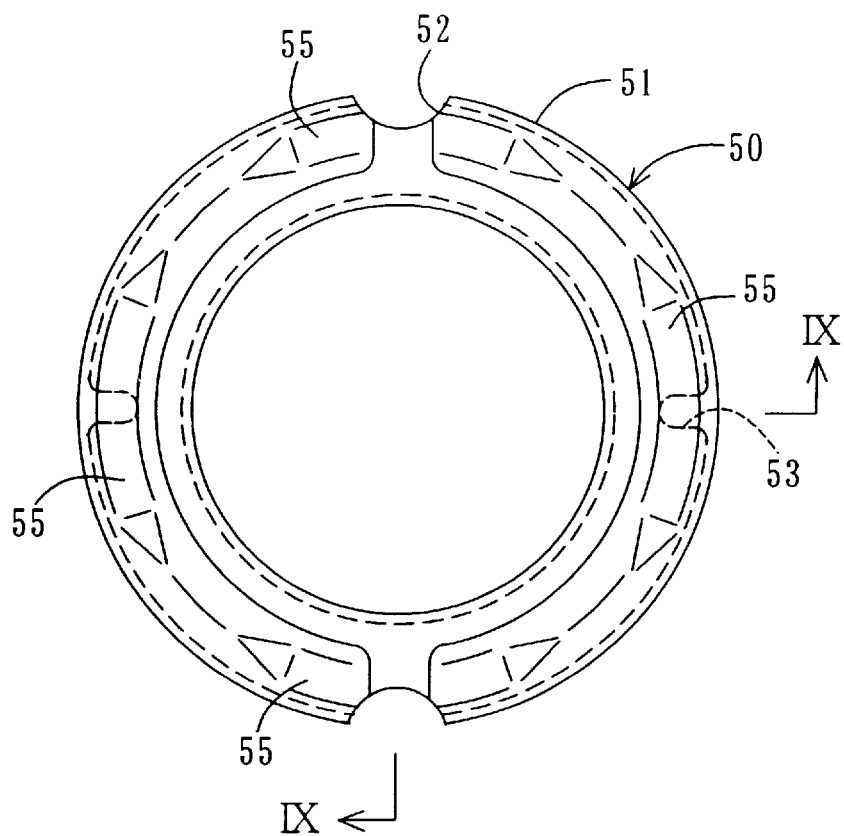
FIG. 8 is a plan view showing an outer cylindrical metal member.
Figure 9:
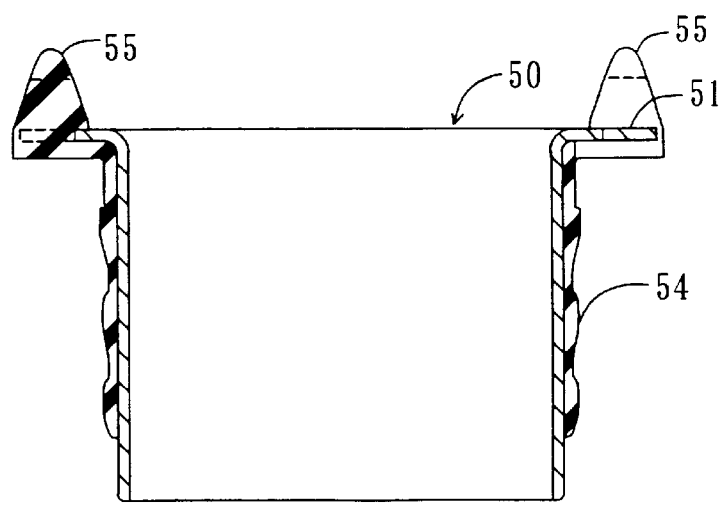
FIG. 9 is a sectional view of the outer cylindrical metal member taken along line IX—IX of FIG. 8.

As shown in FIGS. 8 and 9, the outer cylindrical metal member 50 is substantially equal in axial length to the intermediate metal member 20 and has an inside diameter slightly greater than the outside diameter of the intermediate metal member 20. The outer cylindrical metal member 50 includes an annular flange portion 51 which extends radially outward at one end thereof. The connection portion between the outer cylindrical metal member 50 and the flange portion 51 is formed into a radius shape. A pair of semicircular positioning cut portions 52 are formed on the outer circumferential edge of the flange portion 51 at radially opposite positions. Squarish second cut portions 53 narrower than the cut portions 52 are formed on the outer circumferential edge of the flange portion 51 at positions perpendicular to the cut portions 52. A thin-walled rubber elastic-body seal portion 54 is formed on the outer circumferential surface of the outer cylindrical metal member 50 and on the axially inward surface of the flange portion 51. Four rubber stopper portions 55, each of which assumes a substantially triangular cross section, are formed on the axially outward surface of the flange portion 51 at four circumferential positions.

The rubber elastic-body seal portion 54 and the stopper portions 55 are formed integral with the outer cylindrical metal member 50 through vulcanizing molding by use of an unillustrated mold in which the outer cylindrical metal member 50 is preset. The above-mentioned vulcanized rubber molding M is press-fitted into the outer cylindrical metal member 50 through the flange portion 51 such that the stopper portions 55 are aligned with the other end 10b (the upper end illustrated in the drawings) of the inner cylindrical metal member 10, thereby yielding the liquid-filled vibration isolator.

The outer cylindrical metal member 50 and the vulcanized rubber molding M are assembled in the following manner. The outer cylindrical metal member 50 and the vulcanized rubber molding M are immersed in liquid contained in a tank. Then, the vulcanized rubber molding M is press-fitted into the outer cylindrical metal member 50 to thereby fill the first and second side-cavity portions 33 and 34 of the rubber elastic-body 30 with liquid, thereby yielding the liquid-filled vibration isolator of the present embodiment. The first and second side-cavity portions 33 and 34 filled with liquid serve as a pair of liquid chambers K which are filled with liquid in a liquid-tight manner. Similarly, the groove portion 42 formed in the exterior rubber portion 41 of the rubber elastic-body 30 is filled with liquid to thereby serve as an orifice path for establishing communication between the two liquid chambers K.

Figure 10:
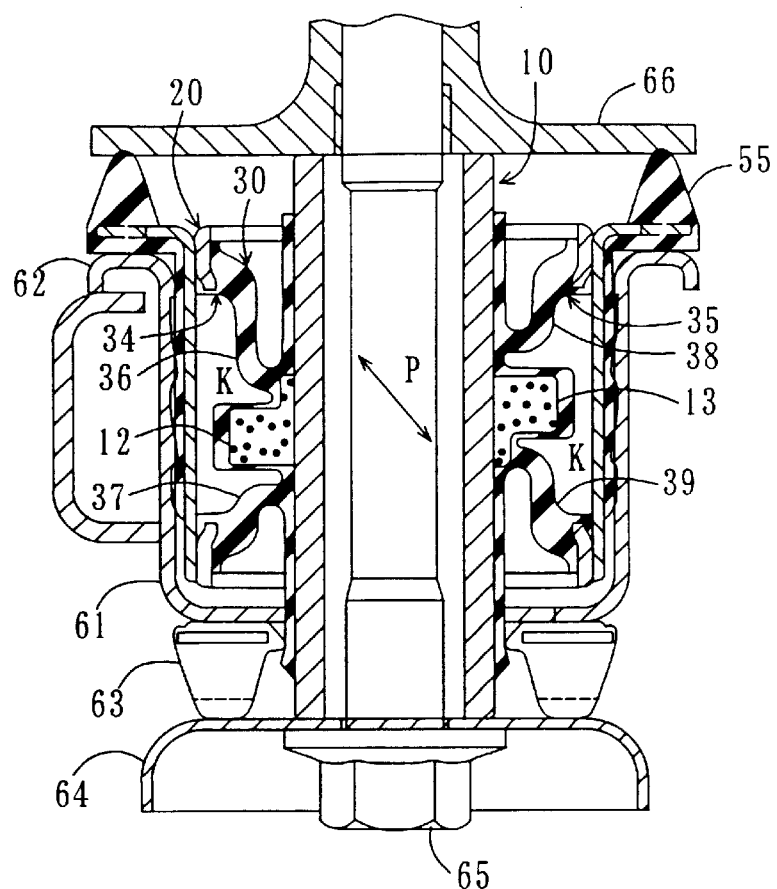
FIG. 10 is a schematic sectional view showing the liquid-filled vibration isolator mounted on a vehicle.
Figure 11:
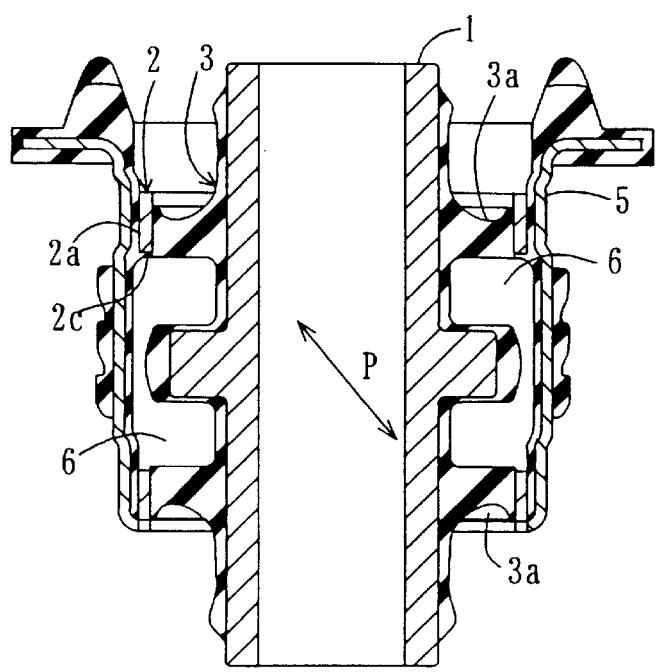
FIG. 11 is a sectional view of a conventional liquid-filled vibration isolator taken along line XI—XI of FIG. 13.
Figure 12:
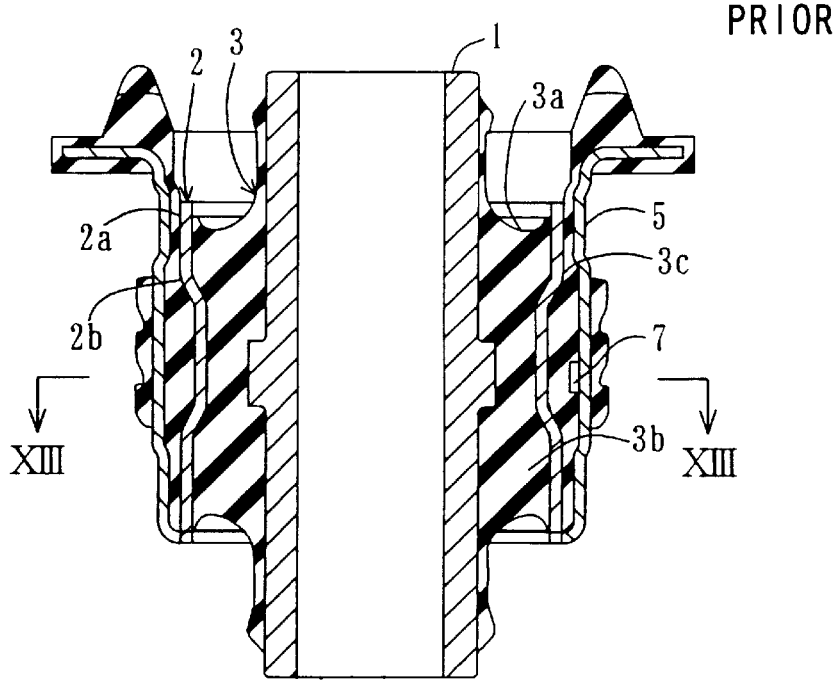
FIG. 12 is a sectional view of the conventional liquid-filled vibration isolator taken along line XII—XII of FIG. 13.
Figure 13:
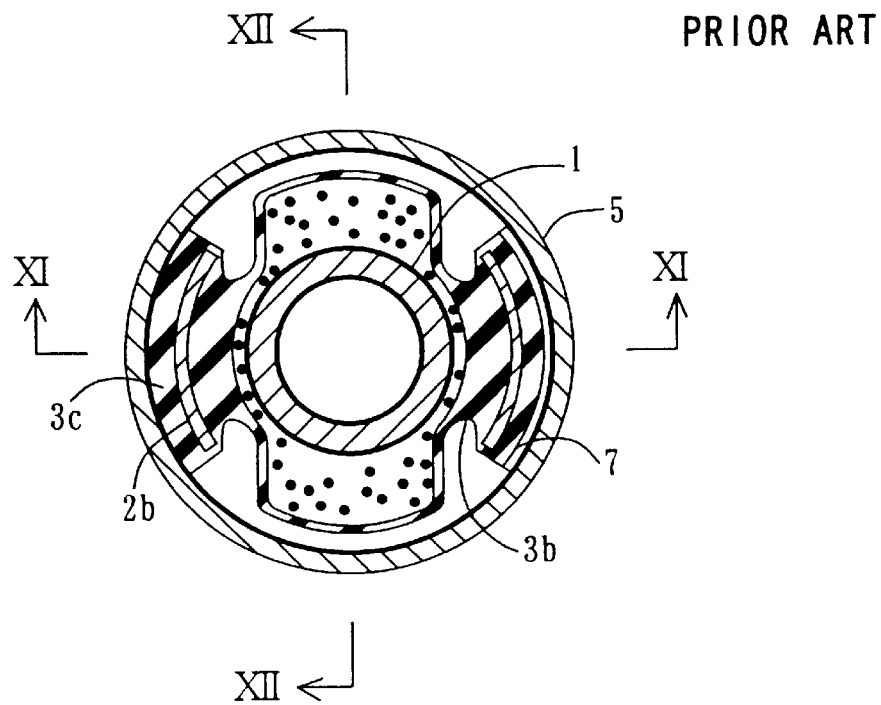
FIG. 13 is a sectional view of the conventional liquid-filled vibration isolator taken along line XIII—XIII of FIG. 12.
Figure 14:
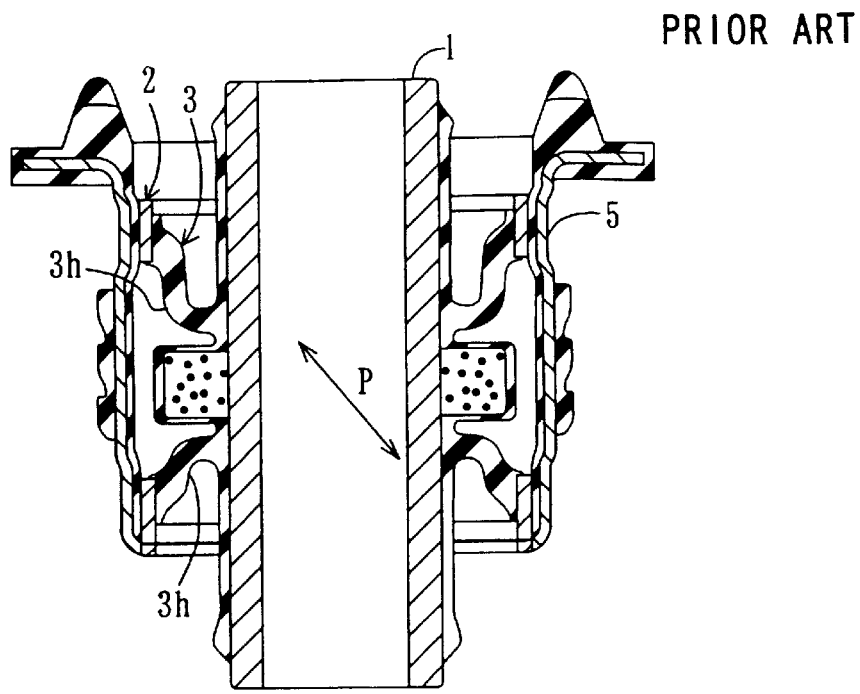
FIG. 14 is a sectional view showing another conventional liquid-filled vibration isolator.

As shown in FIG. 10, the thus-configured liquid-filled vibration isolator is attached to the body of a vehicle in the following manner. The outer cylindrical metal member 50 is press-fitted into a cylindrical mounting member 61 of the sub-frame of the vehicle such that the inner cylindrical metal member 10 stands upright with the stopper portions 55 facing up and such that the first side-cavity portion 33 is oriented toward the front of the vehicle, and the second side-cavity portion 34 is oriented toward the rear of the vehicle. The cylindrical mounting member 61 includes a flange portion 62 located at one end thereof and abutting the flange portion 51 of the outer cylindrical metal member 50, and rubber stopper portions 63 located at the other end thereof. Then, a bolt 65 is inserted into the inner cylindrical metal member 10 through the one end 10a via a disk-like support member 64 and is screw-engaged with a member 66 of the vehicle body. Thus, the liquid-filled vibration isolator is fixedly attached to the sub-frame and to the vehicle body. The liquid-filled vibration isolator is arranged such that the long first diaphragm portion 36 and the long fourth diaphragm portion 39, which are located at diagonally opposite positions with respect to the inner cylindrical metal member 10, coincide with the direction of vibration input P which is imposed obliquely by the sub-frame according to acceleration/deceleration of the vehicle.

Upon entry of vibration input P which is imposed obliquely according to acceleration/deceleration of the vehicle, the thus-configured liquid-filled vibration isolator damps vibration by means of the rubber elastic-body 30 to thereby suppress transmission of vibration to the vehicle body. Upon entry of an excessively large vibration input, the first and second protrusion portions 12 and 13 of the stopper member 11 fixedly attached to the inner cylindrical metal member 10 can suppress the vibration input. The rubber elastic-body 30 is arranged such that the long first diaphragm portion 36 and the long fourth diaphragm portion 39 are located at diagonally opposite positions with respect to the inner cylindrical metal member 10 along a diagonal direction coinciding with the direction of vibration input P which is imposed obliquely according to acceleration/deceleration of the vehicle. Thus, the free length of the rubber elastic-body 30 as measured along the diagonal direction is sufficiently long as compared with that as measured along another diagonal direction along which the second and third diaphragm portions 37 and 38 are arranged. Therefore, the tensile strain of the first and fourth diaphragm portions 36 and 39 derived from vibration input P can be reduced to a level such that the FEM strain thereof becomes about 80%, thereby enhancing the durability of the diaphragm portions 36 and 39.

The above embodiment is described while mentioning the stopper member 11 attached to the inner cylindrical metal member 10. However, the stopper member 11 may be omitted as needed. The liquid-filled vibration isolator of the embodiment is used to prevent transmission of vibration from the rear sub-frame of a vehicle to the body of the vehicle. However, the liquid-filled vibration isolator may be used as, for example, a cab mount or a differential mount. While the present invention has been described with reference to the above embodiment, the present invention is not limited thereto, but may be embodied in many other specific forms without departing from the spirit or scope of the invention.

What is claimed is:
1. A liquid-filled vibration isolator comprising:
an inner cylindrical metal member;
a cylindrical intermediate metal member disposed outside said inner cylindrical metal member with a space formed between said inner cylindrical metal member and said intermediate metal member, said intermediate metal member comprising a pair of ring portions disposed at corresponding axial ends thereof, a pair of connection portions disposed at radially opposite positions and integrally connecting the ring portions, and a pair of window portions defined by the ring portions and the connection portions;
a rubber elastic-body comprising a pair of inclined side wall portions connecting the ring portions of said intermediate metal member and an axially central portion of said inner cylindrical metal member along a circumferential direction, arm portions axially connecting the side wall portions and connecting the connection portions and said inner cylindrical metal member, and a pair of cavity portions defined by the side wall portions and the arm portions and opening at the corresponding window portions;
an outer cylindrical metal member fixedly disposed outside said intermediate metal member in a substantially coaxial manner and sealed in a liquid-tight manner against said intermediate metal member by means of a rubber seal portion, to thereby define a pair of liquid chambers in the corresponding cavity portions; and
an orifice path formed between and extending along said outer cylindrical metal member and the connection portion of said intermediate metal member so as to establish communication between the liquid chambers;
said inner cylindrical metal member being oriented in a vertical direction and fixedly attached to a member of a vehicle body with the liquid chambers being oriented in the front-rear direction of a vehicle, and said outer cylindrical metal member being fixedly attached to a counterpart member, wherein a first pair of said inclined side wall portions are formed at one of radially opposite circumferential positions between said connection portions so as to be located on the front side of said inner cylindrical metal member with respect to the front-rear direction of the vehicle, a second pair of said inclined side wall portions are formed at the other of the radially opposite circumferential positions so as to be located on the rear side of said inner cylindrical metal member with respect to the front-rear direction of the vehicle, and, among the first and second pairs of said inclined side wall portions, two inclined side wall portions located diagonally opposite each other with respect to said inner cylindrical metal member are longer than the remaining two side wall portions.

2. A liquid-filled vibration isolator according to claim 1, wherein the diagonal direction along which the longer side wall portions extend coincides with the direction of vibration input.

3. A liquid-filled vibration isolator according to claim 1 or 2, further comprising a pair of stoppers fixedly attached to the outer cylindrical surface of said inner cylindrical metal member in such a manner as to project into the corresponding liquid chambers and in such a manner as to be vertically biased toward opposite directions with respect to the center of said inner cylindrical metal member.

4. A liquid-filled vibration isolator according to claim 1 or 2, wherein the side wall portions each assume an S-shaped axial cross section.

5. A liquid-filled vibration isolator according to claim 3, wherein the side wall portions each assume an S-shaped axial cross section.

* * * * *